United States Patent [19]

Ljung

[11] 4,444,502

[45] Apr. 24, 1984

[54] RING LASER GYROSCOPE WITH FIBER OPTIC BEAM COMBINER

[75] Inventor: Bo H. G. Ljung, Wayne, N.J.

[73] Assignee: The Singer Company, Little Falls, N.J.

[21] Appl. No.: 270,287

[22] Filed: Jun. 4, 1981

[51] Int. Cl.³ .............................................. G01C 19/64
[52] U.S. Cl. ................................ 356/350; 350/96.18; 372/108
[58] Field of Search ..................... 356/350; 350/96.18, 350/96.19; 372/94, 108

[56] References Cited

U.S. PATENT DOCUMENTS 4,039,260 8/1977 Redman ............................... 356/350

Primary Examiner—Vincent P. McGraw
Attorney, Agent, or Firm—Morris Liss; T. W. Kennedy

[57] ABSTRACT

An electromechanically dithered ring laser gyroscope includes a beam combiner utilizing optical fibers instead of conventional optics. This permits a beam measuring photodetector and associated electronics to be positioned outside the gyroscope or its enclosure. The invention further includes a dither compensator using optical fibers thereby replacing sensitive electronic or optical dither compensating components.

11 Claims, 8 Drawing Figures

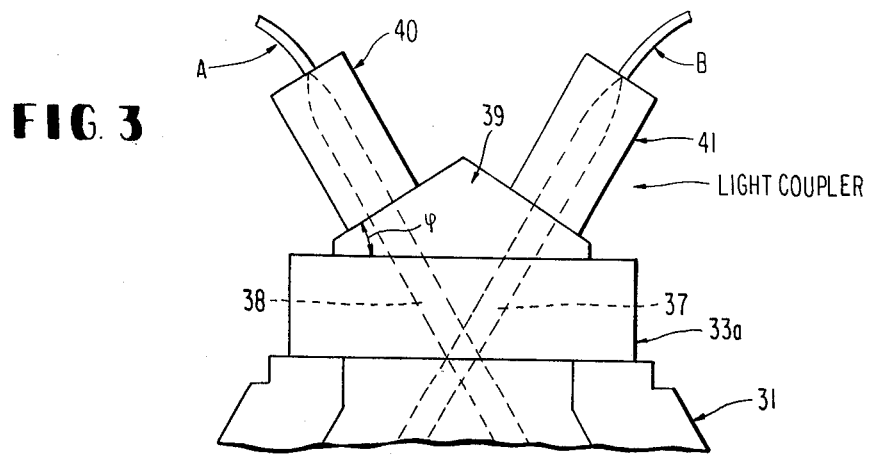
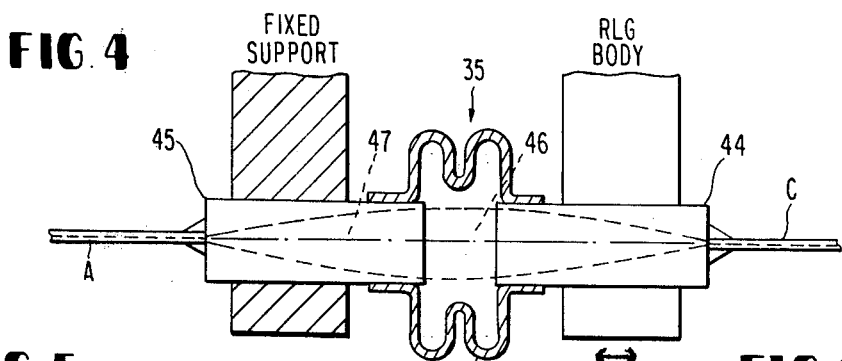
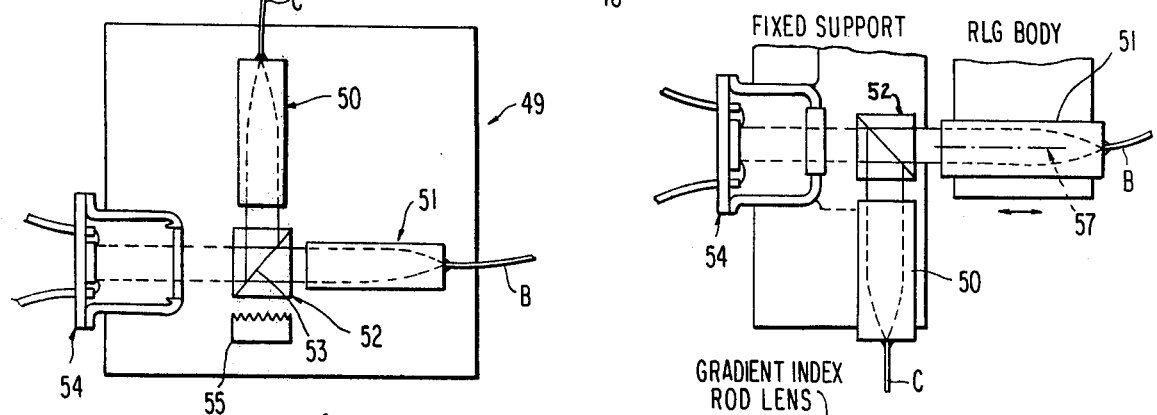
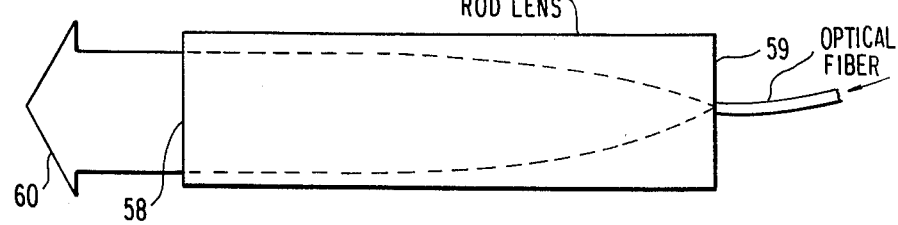
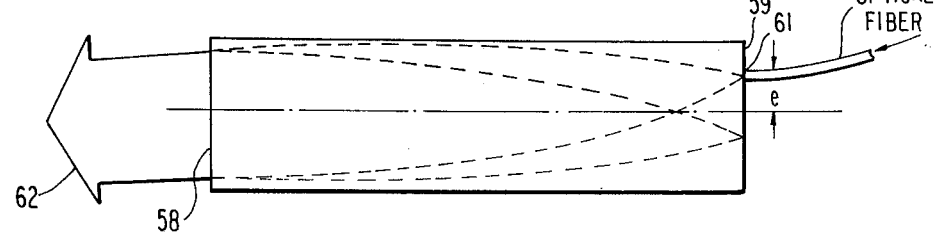

RING LASER GYROSCOPE WITH FIBER OPTIC BEAM COMBINER

FIELD OF THE INVENTION

The present invention relates to dithered ring laser gyroscopes (RLG) and more particularly to such a gyroscope having a beam combiner and dither compensator utilizing optical fibers.

BRIEF DESCRIPTION OF THE PRIOR ART

Ring laser gyroscopes are well-established in the prior art. Examples of these devices are disclosed in U.S. Pat. Nos. 4,190,364 to Ljung et al and 4,167,336 to Ljung, both assigned to the assignee of this application.

The traditional ring laser gyroscope (RLG) dithers around a point that is mechanically offset from the true center thereof. This leads to a problem in balancing the gyro which is accomplished either by machining it unsymmetrically, or in a more recent design, but utilizing an isosceles triangle. Conventional designs utilize corner cube retroreflectors which must be supported within the gyro enclosure, such that its distance from the gyro does not change. This can be accomplished by using an invar arm to support the corner cube. Even the relatively small expansion of invar is, however, not enough. Additional thermal compensation is necessary to prevent the corner cube retroreflector from moving as the temperature is changed. Such additional compensation can be accomplished by the judicious use of higher expansion material to move the corner cube retroreflector towards the RLG as the temperature is increased, similar to the compensation pendulum used in clocks. This is necessary because any slight movement of the corner cube retroreflector during temperature changes can cause output pulses to occur at the output of the RLG, even though no input rate is presented to the RLG.

To illustrate this effect, consider a typical example, where the RLG retroreflector is mounted on an invar arm. With the arm length $L=0.08$ m, the temperature rise is $\Delta\theta = 4.4°$ C. for time $\Delta t = 60$ sec. The coefficient of expansion $\alpha = 1.9 \cdot 10^{-6}/°C$. and the length change $\Delta L$ per unit time $\Delta t$ is:

$$\frac{\Delta L}{\Delta t} = L \alpha \frac{\Delta\theta}{\Delta t} \left(\frac{m}{sec}\right) \quad (1)$$

The drift rate, $\dot{\Phi}$, due to a change in the location of the retroreflector is:

$$\dot{\Phi} = k \frac{\Delta L}{\Delta t} \cos \psi \quad (°/hr) \quad (2)$$

Where K is a constant determined by the size of the RLG. For a typical gyro, $$K = \frac{2 \cdot 2.118}{0.6328 \cdot 10^{-6}} \left(\frac{°, sec}{hr, m}\right),$$

where 2.118 is the RLG scale factor in arcsec/pulse and $0.6328 \cdot 10^{-6}$ is the wavelength in meters. Cos $\psi$ is the radial component of expansion projected on the direction of light into the retroreflector. In this example cos $\psi = 0.934$. Combining equations (1) and (2) and solving yields $\dot{\Phi} = 0.07°/hr$. In order to reduce the drift rate to a more desirable value, for example, $0.005°/hr$, the expansion should be reduced by a factor of 14. This can be accomplished with thermal compensation as mentioned earlier but this is difficult.

BRIEF DESCRIPTION OF THE PRESENT INVENTION

The purpose of this invention is to provide a low cost compensating beam combiner for mechanically dithered ring laser gyroscopes (RLG). By the utilization of optical fibers in place of conventional optics, a dual photodetector with its associated amplifiers can be placed outside the RLG enclosure. This has the advantage of eliminating all electronic components from the gyro enclosure. Also, the commonly used corner cube retroreflector, which is expensive, is eliminated.

A prism is utilized to couple light from the RLG to two optical fibers via gradient index rod lenses.

An optical fiber dither compensator is tangentially mounted to a circle of predetermined radius so that the compensator cancels the effect of dither from the RLG.

In order to protect the optical surfaces in the compensator, a miniature bellows may be employed.

The present invention further recognizes a combination of a compensator and a beam combiner in one structure.

The present invention further recognizes a design for avoiding back reflected light within the RLG by utilizing an offset mounting of the fiber optics to the gradient index rod lenses.

The above-mentioned objects and advantages of the present invention will be more clearly understood when considered in conjunction with the accompanying drawings, in which:

BRIEF DESCRIPTION OF THE FIGURES

FIG. 3 is a partial plan view illustrating the detail of an output light coupler from the ring laser gyroscope to optical fibers.

FIG. 4 is a detailed diagram illustrating the optical dither compensator as utilized in the present invention.

FIG. 5 is a detailed view of a beam combiner as utilized in the present invention with a dual photodetector.

FIG. 6 is a detailed view illustrating an alternate design that consists of a combination of a compensator and beam combiner.

FIG. 7A illustrates a symmetrical arrangement of an optical fiber for connection to the RLG which would result in back reflected light going back into the RLG.

FIG. 7B is a view, similar to that of FIG. 7A, but illustrating an offset mounting of an optical fiber to avoid back reflected light.

DETAILED DESCRIPTION OF THE INVENTION

Figure 1:
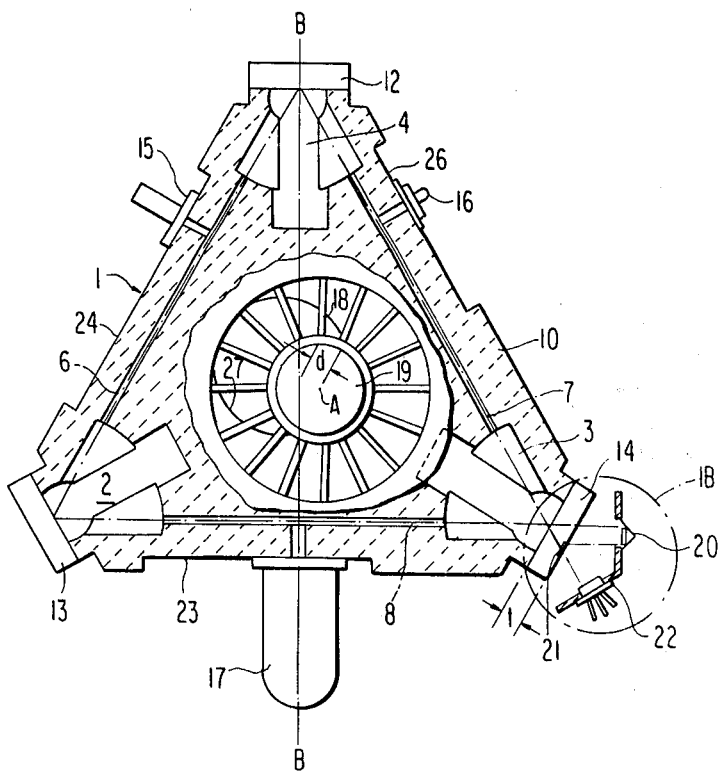
FIG. 1 is a sectional view of a prior art ring laser gyro.

In order to form a basis for the discussion of the present invention, reference is made to FIG. 1 which illustrates a prior art ring laser gyroscope (RLG). The RLG has a triangularly shaped glass-ceramic body 10. Tubular cavity sections 6, 7 and 8 form triangular sections which contain a gas mixture such as helium and neon. Larger cavities 2, 3 and 4 interconnect the triangular sections to form a continuous cavity. A mirror 12 of high reflectivity encloses the upper corner of the gyro while a similar mirror 13 encloses the lower left corner. An output mirror 14 encloses the lower right corner of the RLG. The output mirror 14 has a half-silvered portion 21. The mirror combination 14, 21 reflects light impinging upon it as well as permits the passage of light outwardly from the lower right end of the gyro.

A first anode 15 is mounted in the body 10 of the RLG and has access to the cavity section 6. A second anode 16 is similarly mounted to the body 10 of the RLG. A cathode 17 is mounted to the lower edge of the triangular glass-ceramic gyro body 10 and there is access between the cathode and the corresponding cavity section 8. Upon electrical energization of the anode and cathode electrodes, lasing of the helium neon gas mixture occurs wherein clockwise (CW) and counterclockwise (CCW) beams occur within the interconnected cavity sections 6, 7 and 8. Radial torsion springs 18 are mounted between a support post 19 and the body 10 of the RLG. Due to normal irregularities on the surface of the mirrors 12, 13 and 14, a beam impinging upon a particular mirror will not be perfectly reflected. Rather, some back scattering occurs. This causes the beat frequency between the two beams to disappear at low inertial rotation input rates. This is referred to as the lock-in effect, whch has been recognized for some time in the prior art. This has been solved by driving the RLG body 10 in rotational oscillation (dither). The means for accomplishing the dither conventionally include a piezoelectric actuator (not shown) connected to the spring 18 and causing the body 10 to oscillate angularly at its natural mechanical resonance frequency.

The dither is superimposed upon the actual rotation of the gyro in inertial space. Accordingly, it is necessary to recover inertial rotation data free from dither. Precise recovery of the actual data has been previously accomplished by using a compensating beam combiner. This beam combiner uses a corner cube retroreflector 20. The CW and CCW laser beams are combined by means of the half-silvered mirror 21. Heterodyning or mixing of the CW and CCW beams is detected with a dual photodetector 22 mounted to a bracket which is customarily fixed to a housing which encloses the combiner and the RLG in a hermetically sealed case (not shown). With this implementation of components, an interferometer is formed for the CW and CCW beams. Simply stated, an interferometer is any arrangement whereby a beam of light is separated into two or more parts by partial transmission or reflection, the parts being subsequently reunited after traversing different optical paths. The sensitivity of the interferometer formed is equal and opposite to that of the RLG output when the gyro is dithered about Point A, on the axis of post 19. In order to achieve the necessary precise alignment of the beam combiner with the output mirror 14, an offset "d" is made to exist between the axis Point A and the geometric center of the RLG body 10. The offset "d" is made to equal the thickness "t" of the mirror 14.

The prior art teaches combining the CW and CCW beams so that a small angle of convergence is formed between the two beams as they reach the photodetector 22. By so doing, an interference pattern is formed that consists of bright areas interspaced by dark areas. The bar-shaped interference pattern moves to either side, depending on the direction the RLG is rotated. The sense of rotation of the RLG can thus be detected by dividing the photodetector into two areas, spaced one-fourth the distance between the bright areas in the bar-shaped pattern. The performance of the RLG is extremely sensitive to the mechanical stability of the compensating beam combiner with respect to the RLG. As previously mentioned, the sensitivity manifests itself in drift of the true inertial rotation data output signal due to warm-up of the beam combiner. This problem requires the use of low expansion material in the support structure that holds the corner cube retroreflector.

Asymmetrical cutouts 23, 24 and 26, together with offset opening 27 formed in the body 10, are used to mechanically balance the body 10 around its support post 19. This balancing is necessary in order to avoid mechanical coupling to external sources of linear vibration.

A major problem with the prior art ring laser gyro of FIG. 1 resides in the extreme sensitivity to temperature gradients across the symmetry axis B-B of the RLG body 10. These gradients change the flow of gas in the RLG cavity which results in output pulses from the RLG at the times when no actual rotation in inertial space is being experienced by the RLG. Instability results when there is a change in the external temperature. The reason for this is that the asymmetrical block induces asymmetrical temperature gradients with resulting asymmetrical mechanical changes.

Figure 2:
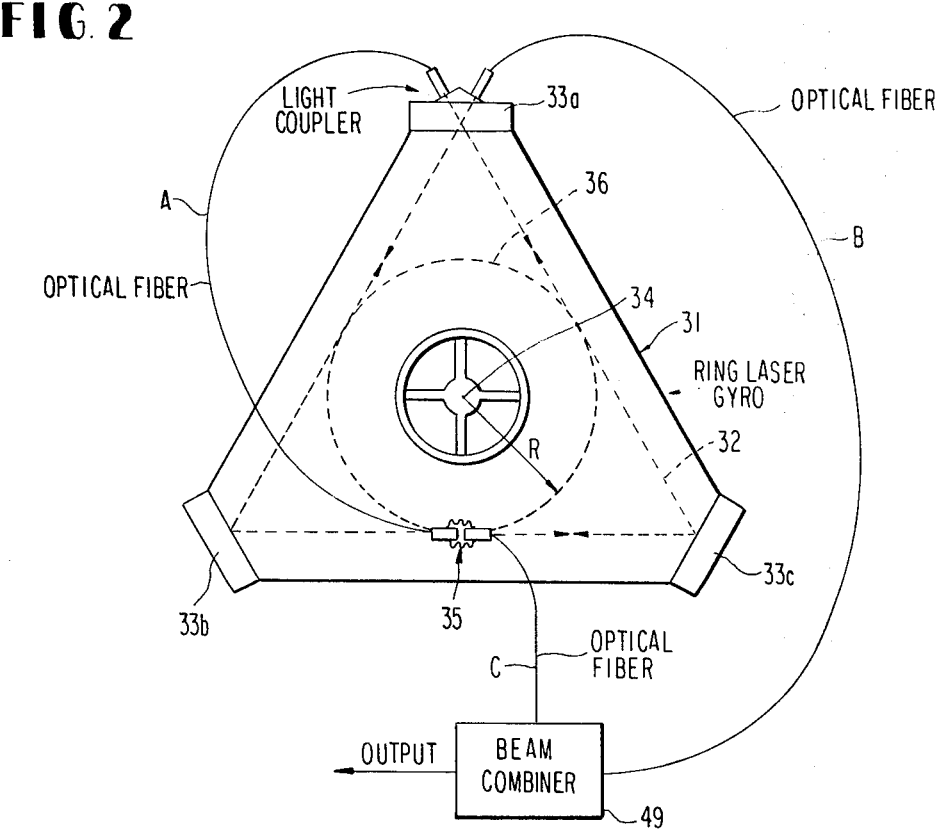
FIG. 2 is a simplified mechanical diagram of the present RLG.

Referring to FIG. 2, a simplified schematic illustration of the present invention is shown, including RLG 31 equipped with three mirrors 33a, 33b, and 33c. A clockwise (CW) and counterclockwise (CCW) beam 32 travels along the optical path internal of the RLG such as in prior art devices. A small portion of beam 32 is transmitted through mirror 33a. The RLG body 31 is mechanically dithered about the central point 34. Typically, the dither frequency is 400 Hz and the dither amplitude is 100 arcseconds. As previously explained, dithering minimizes the lock-in effects in an RLG. At the same time such effects are eliminated, the RLG actually responds to the dither, generating output pulses which must be compensated for before a signal appearing at the indicated output may be used in an application such as navigation. This compensation is accomplished by a dither compensator 35 which is mounted to the RLG in a precise fashion. As will be noted, an imaginary circle 36 of radius R is seen to be inscribed within the triangular path of beam 32. The dither compensator 35, to be discussed in greater detail, is mounted with its axis of symmetry tangentially to the circle 36. An optical fiber A is optically coupled between mirror 33a and the dither compensator 35. A second optical fiber C transmits the optical output from the compensator 35 to a beam combiner 49. A third optical fiber B is coupled between the mirror 33a and an optical input of the beam combiner 49.

FIG. 3 is a detailed illustration showing the CW beam 37 and CCW beam 38 passing through mirror 33a and coupled, through prism 39 toward optical fibers A and B. The prism has an edge angle ψ, such that the two beams 37 and 38 exit from prism 39 at a near normal incidence. The two gradient rod lenses 40 and 41 focus respective beams 38 and 37 and transmit them to corresponding optical fibers A and B. These fibers are of the single mode type. All described components may be fastened to one another with conventional transparent adhesive. The gradient rod lenses 40 and 41 are commercially available from Nippon Sheet Glass Company of Japan.

Referring to FIG. 4, a detailed drawing is shown of the optical dither compensator, shown generally by reference numeral 35 in FIG. 2. Gradient index rod lenses 45 and 44 respectively couple light out of and into respective optical fibers A and B. The light beam appearing at 46, between adjacent surfaces of lenses 44 and 45 is collimated. Rod lens 44 is appropriately attached to the RLG body. Rod lens 45 is attached to a fixed surface, such as a housing which normally encloses the RLG. Unlike prior art devices, the discussed components need not be fastened to low expansion materials. The reason for this is that if expansion takes place, it occurs in a radial direction from the center of the RLG. Such radial expansion, where $\cos \psi = 0$, does not cause false output pulses. With the dither compensator mounted such that its line of symmetry 47 is tangent to the inscribed circle 36 (FIG. 2), the sensitivity of the dither compensator shown in FIG. 4 is precisely equal but opposite to that of the RLG. The effect is to completely eliminate the dither pulses in the output of the RLG.

The entire optical dither compensator 35 can be shielded from environmental effects such as dust and humidity by adding a bellows 48. This bellows is preferably made from metal, for example, electro deposited nickel which renders the components of the compensator impervious to moisture. With such a shield in place, a sealed RLG case is unnecessary. This may reduce the fabrication cost of the RLG substantially, when compared to the prior art.

FIG. 5 details the beam combiner previously generally indicated by reference numeral 49 in FIG. 2. The beam combiner 49 includes two rod gradient lenses 50 and 51, located at substantially right angles to one another. A conventional beam splitter cube 52 with a 50 percent reflective layer 53 is positioned at the point of intersection between the axes of symmetry of lenses 50 and 51. A dual photodetector 54, of conventional design, is positioned coaxially with the cube 52 and lens 51, the photodetector being located at the cube side opposite lens 51. A beam absorber 55, of conventional design, is located coaxially with lens 50 and cube 52. The purpose of absorber 55 is to absorb the light transmitted from lens 50 and passing through cube 52. The cube is adjusted so that an interference pattern is formed on the dual photodetector 54. This is caused by allowing the two incident beams, transmitted through lenses 50, 51 and cube 52, to converge on the same photodetector area. The convergence angle is chosen to form an interference pattern so that the light on two photodetector segments represents a 90 degree phase shift. Thus, when full brightness strikes one segment, the other is at 50 percent brightness. This serves the purpose of indicating rotational direction of the RLG. The prior art literature includes a beam combiner of the general type illustrated in FIG. 5 but with only a single photodetector being used instead of the presently disclosed dual photodetector. The symmetry line in the dual photodetector is so positioned with respect to the convergence angle that the rotation of rod lens 44 due to the dither causes the interference pattern to shift along the symmetry line. This insures that the compensator is dither amplitude insensitive.

FIG. 6 illustrates an alternate embodiment of a fiber optic beam combiner. The design of FIG. 6 combines the compensator of FIG. 4, along with the beam combiner of FIG. 5. Thus, identical components are similarly numbered. The distinction of the embodiment shown in FIG. 6 resides in the supporting of gradient index rod lens 51 in an orientation generally forming a tangent with the inscribed circle 36 (FIG. 2). Further, the lens 51 is physically supported by the RLG body (or a suitable extension). Thus, the lens 51 vibrates back and forth with the RLG. The remaining components, shown to the left of lens 51 are physically supported in a fixed position to a surface such as a housing for the RLG. Although not shown, bellows may be added to enclose lenses 50 and 51 thereby serving as protection from dust and moisture, if an RLG case is completely eliminated. In the latter event, the illustrated fixed support for the combiner components of FIG. 6 would require fastening to an alternate fixed surface.

As always, back reflection in the RLG is of primary importance because it causes lock-in and increased uncertainty of the indicated output even when properly minimized with dither. Back reflection from the gradient index rod lenses can be decreased by anti-reflective coating of the exposed flat surfaces. However, it is possible to virtually eliminate all back reflection as will now be explained in connection with FIGS. 7A and B.

In FIG. 7A, an optical fiber is illustrated as being attached to a gradient index rod lens at a central point of surface 59. Although the main portion of light will exit from an opposite surface 58 of the lens, the surface 58 does cause reflection of a certain amount of light back toward the optical fiber.

FIG. 7B illustrates a modification of the optical fiber attachment which virtually eliminates the back reflection. By moving the optical fiber from its previously illustrated symmetrical position on rod lens surface 59 to a slightly offset position, the reflected light from the flat surface 58 can be made to miss the optical fiber, virtually in its entirety. The optical fiber offset, in relation to surface 59, is indicated by dimension "e".

Accordingly, the previously described invention results in an improved RLG permitting lower fabrication cost and stable operation. Greater installation flexibility of the invention becomes available because electronic components can be either placed outside an RLG enclosure (not shown) or such an enclosure can be eliminated entirely. Reduction and fabrication costs is achieved by the use of standard low-cost components such as gradient index rod lenses and optical fibers instead of considerably more expensive corner cube retroreflectors, as required by prior art devices. Stable operation is achieved with regard to temperature changes by means of mounting the compensator such that radial temperature expansion cannot cause a false output from the RLG. Further, offset mounting of the RLG as in prior art is not required. This minimizes thermally induced drift in the RLG.

The present invention allows electronic components to be mounted outside the body of the RLG, the heat from these components does therefore not affect the RLG.

By following the design of the present invention, an RLG can be made to operate in moist, dusty or low pressure environments, without the use of a case. This results in a lower cost unit.

It should be understood that the invention is not limited to the exact details of construction shown and described herein for obvious modifications will occur to persons skilled in the art.

I claim:

1. In a ring laser gyroscope (RLG) having clockwise (CW) and counterclockwise (CCW) light beams traveling along a predetermined internal geometric path inscribing a circle therein, the improvement comprising:
   a mirror at an apex of the path which permits partial light transmission;
   a prism contacting the mirror for directing the CW and CCW beams in predetermined directions;
   first and second lens means connected to the prism for focussing the CW and CCW beams transmitted through the prism;
   first and second optical fibers respectively connected at first ends thereof to the lens means for directing the CW and CCW beams externally of the RLG; and
   means for combining the CW and CCW beams, carried in the fibers, and generating an electrical signal output in response thereto.

2. The subject matter of claim 1 wherein each lens means is a gradient index rod lens.

3. The subject matter of claim 1 wherein each lens means is a gradient index rod lens and further wherein the beam combining means comprises:
   third and fourth gradient index rod lenses optically communicating with opposite ends of the optical fibers for focussing the CW and CCW beams; and
   means for projecting the focussed beams onto photodetecting means.

4. The subject matter of claim 1 together with optical fiber means substantially located in tangential relation to the inscribed circle and optically connecting the first optical fiber to the beam combining means for compensating for mechanical dither imposed on the RLG.

5. The structure of claim 3 wherein the third and fourth gradient index rod lenses are oriented perpendicularly to one another and further wherein the projecting means is a beam splitter positioned intermediate the third and the fourth gradient index rod lenses for projecting the focussed CW and CCW beams onto the photodetecting means.

6. The subject matter of claim 5 wherein the photodetecting means comprises a dual photodetector upon which an interference pattern is projected, resulting from the CCW and CW beams.

7. In a ring laser gyroscope (RLG) having clockwise (CW) and counterclockwise (CCW) light beams traveling along a predetermined internal geometric path, the improvement comprising:
   a mirror positioned at an apex of the path permitting partial light transmission;
   a prism contacting the mirror for directing the CW and CCW beams in predetermined directions;
   first and second gradient index rod lens connected to the prism for focussing the CW and CCW beams transmitted through the prism;
   first and second optical fibers respectively connected at first ends thereof to the lenses for directing the CW and CCW beams externally of the RLG;
   means for combining the CW and CCW beams, carried in the fibers, and generating an electrical signal in response thereto;
   and further wherein each beam combining means includes:
      third and fourth gradient index rod lenses optically communicating with the optical fibers for focussing the CW and CCW beams, the third and fourth gradient index rod lenses oriented perpendicularly to one another;
      and further wherein a beam splitter is positioned intermediate the third and the fourth gradient index rod lenses for projecting the CW and CCW beams onto photodetecting means.

8. The subject matter set forth in claim 7 together with a dither compensator comprising:
   a fifth gradient index rod lens connected to a second end of the first optical fiber and fixedly supported in substantially tangential relation to a circle inscribed within the geometric path, but in noncontacting relation to the RLG; and
   a sixth gradient index rod lens connected to a first end of a third optical fiber, the lens being connected to the RLG in substantially tangential relation to the inscribed circle, the fifth and sixth gradient index rod lenses being in optical alignment with each other, the second end of the third optical fiber being connected to the third gradient index rod lens of the beam combining means.

9. The subject matter of claim 8 together with a protective bellows surrounding the fifth and sixth gradient index rod lens.

10. The subject matter set forth in claim 7 wherein the third gradient index rod lens is fixedly supported in noncontacting relationship with the RLG, and further wherein the fourth gradient index rod lens is connected to the RLG for experiencing the dither motion thereof and thereby enabling compensation for such motion.

11. The subject matter of claim 10 wherein preselected optical fibers are mounted to corresponding gradient index rod lenses in a centrally offset relation to avoid transmitting back reflected light from the gradient index rod lens to the fiber.

* * * * *